Jan. 9, 1962 D. L. MILLER 3,016,122
AUTOMATICALLY ENGAGING AND DISENGAGING
OVERRUNNING CLUTCH
Filed Sept. 30, 1959
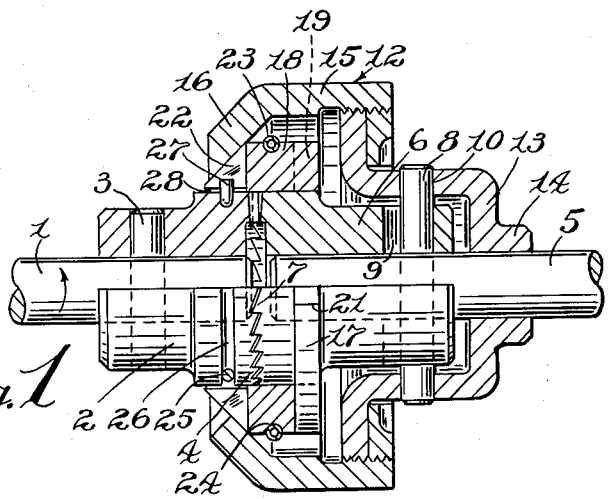
Fig. 1
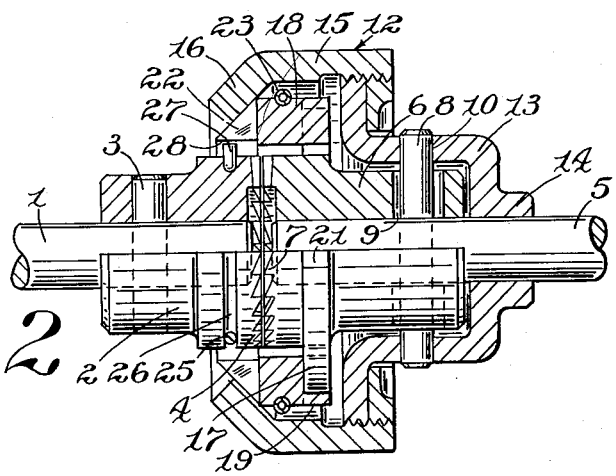
Fig. 2
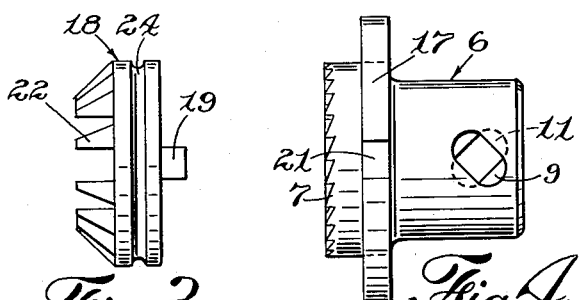
Fig. 3
Fig. 4
WITNESS:
Esther M. Stockton.
INVENTOR.
Donald L. Miller
BY
ATTORNEY

United States Patent Office 3,016,122
Patented Jan. 9, 1962

3,016,122
AUTOMATICALLY ENGAGING AND DISENGAGING OVERRUNNING CLUTCH
Donald L. Miller, Horseheads, N.Y., assignor to The Bendix Corporation, a corporation of Delaware
Filed Sept. 30, 1959, Ser. No. 843,478
6 Claims. (Cl. 192—104)

The present invention relates to an automatically engaging and disengaging overrunning clutch, and more particularly to a dentil type of clutch for connecting aligned shafts or the like.

It is an object of the present invention to provide a novel clutch of the above type which engages positively upon actuation of the driving member to rotate the driven member, overruns freely when the speed of the driven member exceeds that of the driving member, and reengages promptly when the driven member ceases to overrun the driving member.

It is another object to provide such a device embodying a load-actuated means for pressing the clutch members together.

It is another object to provide such a device incorporating means for completely disconnecting the clutch members when the driven member overruns above a predetermined rotary speed.

It is another object to provide such a device having a frictional retarder means for causing re-engagement of the clutch members when the driven member decelerates to synchronism with the driving member.

Further objects and advantages will be apparent from the following description taken in connection with the accompanying drawing in which:

FIG. 1 is a side elevational view, partly broken away and in section, of a preferred embodiment of the invention showing the clutch members in normal or engaged positions;

FIG. 2 is a view similar to FIG. 1, showing the parts in the positions assumed when the driven shaft is overrunning at or above the critical speed;

FIG. 3 is a detail view in side elevation of one of the centrifugal weight members; and FIG. 4 is a detail view in side elevation of the driven clutch member.

In FIG. 1 of the drawing there is illustrated a driving shaft 1 which is mounted for rotation but prevented from axial movement in any suitable manner (not illustrated). A driving clutch member 2 is fixed on the driving shaft as by means of a cross pin 3 and is provided on its face with a plurality of laterally extending overrunning clutch teeth 4 which are preferably of the "saw-tooth" conformation illustrated.

A driven shaft 5 is mounted in any suitable manner for rotation in alignment with the driving shaft 1 while prevented from axial movement. A generally cylindrical driven clutch member 6 is slidably journalled on the end of the driven shaft 5, and is provided with laterally extending teeth 7 adapted to mate with the teeth 4 of the driving clutch member 2.

Means for traversing the driven clutch member 6 into and out of engagement with the driving clutch member 2 is provided comprising a pin 8 rigidly mounted in the driven shaft 5 and extending radially therefrom for sliding engagement in slots 9 and 11 formed in the driven clutch member 6. Slots 9 and 11 are so inclined with respect to the axis of the shafts that torque transmitted from the driven clutch member 6 through the pin 8 to the driven shaft 5 causes the driven clutch member to be forced against the driving clutch member 2 and the clutch teeth 4, 7 thus securely interengaged.

Centrifugal means for disconnecting the clutch members when the driven clutch member overruns above a predetermined rotary speed is provided comprising a casing indicated generally by the numeral 12 rigidly mounted on the driven shaft 5 surrounding the driven clutch member 6. The casing 12 is preferably formed of a cup-shaped element 13 having a hub 14 bearing on the driven shaft and connected rigidly to said shaft by means of the pin 8 which preferably has a press fit in radial openings 10 in the element 13. The cup-shaped element 13 is threaded into a sleeve element 15 having an inwardly extending flange 16 which is inclined axially whereby its inner surface constitutes the frustum of a cone.

The driven clutch member 6 has a flange 17 extending radially outward, spaced from the flange 16 of the sleeve 15, and a plurality of arcuate centrifugally movable weight members 18 (FIG. 3) are located in the space between said flanges 16, 17.

The weight members 18 are keyed for rotation with the driven clutch member 6 by means of laterally extending lugs 19, slidably received in slots 21 in the flange 17, and on their opposite lateral surfaces are formed with a plurality of tapered projections 22, the outer surface of which conforms generally to the inner conical surface of the flange 16 as shown in FIG. 2. The weight members 18 are normally maintained in engagement with the exterior cylindrical surface of the driven clutch member 6 by means of a constricting spring 23 seated in a groove 24 in the periphery of said weight members, which spring is adapted to yield and permit the weight members to move out and further separate the flanges 16, 17 as shown in FIG. 2, responsive to overrunning of the driven clutch member above a predetermined critical speed.

Means are provided for securing prompt re-engagement of the clutch members after such an overruning condition, as soon as the driven clutch member 6 decelerates to synchronism with the driving clutch member 2. For this purpose a spring retarder ring 25 is frictionally mounted in a groove 26 in the periphery of the driving clutch member 2 and is formed with a terminal radial projection 27 adapted to engage between a pair of the projections 22 of the weight members 18. Torque will thus be transmitted frictionally from the driving clutch member 2 to the weight members 18, and thence by means of the connections 19, 17 to the driven clutch member 6. In order to completely disconnect the driven clutch member 6 from the driving clutch member 2 when the driven clutch member is overrunning above the critical speed, the projections 22 of the weight members 18 are undercut slightly as illustrated at 28, and the projection 27 of the retarder spring 25 is made sufficiently short to be disengaged from the projections 22 when the weight members 18 are in their outer position as shown in FIG. 2.

In operation, starting with the parts in the positions illustrated in FIG. 1, rotation of the drive shaft 1 in the direction of the arrow is transmitted through the driving clutch member 2 to the driven clutch member 6 to rotate the driven shaft 5 by means of the pin 8. As best illustrated in FIG. 4, the torque so transmitted from the driven clutch member 6 will cause an axial thrust to be produced by the pin and slot connection with the driven shaft 5, which forces the driven clutch member 6 to the left against the driving clutch member 2.

When the driven shaft overruns, the reversal of transmission of torque through the pin and slot connections 8, 9, 11 relieves the pressure on the engaging clutch surfaces allowing the clutch teeth 4, 7 to repulse each other, and disengage. When the driven shaft 5 overruns above the critical speed, the weight members 18 move outwardly against the force of the constricting spring 23 to the positions shown in FIG. 2. The driven clutch member 6 is thus withdrawn from contact with the driving clutch member 2, and the weight members 18 are disengaged from the retarder ring 25. The driven clutch member is thus completely disconnected from the driving shaft and the driving clutch member and overruns freely.

When the driven shaft 5 decelerates below the critical speed, the weight members 18 are moved inwardly by the spring 23, and thereby reengage with the projection 27 of the retarder spring 25, thus reestablishing a light frictional connection between the clutch members. As long as the driven clutch member 6 is rotating faster than the driving clutch member 2, the reaction of this frictional drag causes the pin and slot connections 8, 9, 11 to hold the driven clutch member 6 away from the driving clutch member 2. However, as soon as the driven clutch member 6 decelerates to synchronism with the driving clutch member 2, any further deceleration causes a reversal of the direction of transmission of the frictional torque so that the torque is now transmitted from the driving clutch member to the driven clutch member. The pin and slot connection thus becomes effective to move the driven clutch member 6 into direct positive engagement with the driving clutch member 2 as illustrated in FIG. 1.

Although but one form of the invention has been shown and described in detail, it will be understood that changes may be made in the design and arrangement of the parts without departing from the spirit of the invention.

I claim:

1. In combination, a rotatable driving clutch member having torque-transmitting means formed on a lateral face thereof, a driven shaft rotatably mounted in alignment with the driving clutch member, a driven clutch member slidably journalled on the driven shaft having laterally positioned torque-transmitting means movable into and out of engagement with the torque-transmitting means of the driving clutch member, an axially inclined torque-transmitting connection from the driven clutch member to the driven shaft operable to force the driven clutch member axially into engagement with the driving clutch member, means including centrifugal means for disengaging said clutch members when the driven clutch member overruns above a predetermined speed, and a frictional connection for transmitting torque between the driving clutch member and the driven clutch member when said clutch members are disengaged from each other below said predetermined speed.

2. A device as set forth in claim 1 in which said frictional connection comprises a member frictionally bearing on the driving clutch member and having means thereon which engage said means for disengaging the clutch members below said predetermined speed, said engaging means being rendered inoperative when the driven clutch member is rotating above said predetermined speed.

3. A device as set forth in claim 1 in which said axially inclined connection comprises a radially extending pin fixed in the driven shaft, and a pair of slots formed in the driven clutch member slidably engaging the projecting portions of said pin and so inclined to the axis of the driven shaft that torque from the driving clutch member forces the driven clutch member into contact therewith.

4. A device as set forth in claim 1 in which said means for disengaging the clutch members comprises a housing fixedly mounted on the driven shaft surrounding the driven clutch member, said housing having an inwardly extending flange and said driven clutch member having an outwardly extending flange, one of said flanges being inclined with respect to the other, the centrifugal means comprising a movable weight member between said flanges connected to rotate with the driven clutch member and cooperating with said flanges to move the driven clutch member away from the driving clutch member responsive to radial movement of the weight member; and yielding means resisting such radial movement.

5. A device as set forth in claim 4 in which said frictional connection from the driving clutch member to the driven clutch member comprises a member bearing frictionally on the driving clutch member and connected to rotate with said weight member when the latter is in its normal position, but disconnected therefrom by radial movement of the weight member.

6. A device as set forth in claim 4 in which said frictional connection comprises a spring ring bearing frictionally on the periphery of the driving clutch member and having a radial projection adapted to engage said weight member and transmit rotation thereto, said weight member being free to disengage itself from said projection by radial movement responsive to centrifugal force.

References Cited in the file of this patent

UNITED STATES PATENTS

| 2,143,173 | Shaff | Jan. 10, 1939 |
| 2,546,633 | Dodge | Mar. 27, 1951 |

FOREIGN PATENTS

| 1,165,307 | France | May 27, 1958 |